May 25, 1965 S. K. STAHL 3,184,994
WHEEL DRIVE MECHANISM
Filed Nov. 5, 1962 2 Sheets-Sheet 1

INVENTOR.
SEBALD K. STAHL
BY
ATTORNEYS

May 25, 1965  S. K. STAHL  3,184,994

WHEEL DRIVE MECHANISM

Filed Nov. 5, 1962  2 Sheets-Sheet 2

INVENTOR.
SEBALD K. STAHL
BY Fryer and Grinwold
ATTORNEYS 3,184,994
WHEEL DRIVE MECHANISM
Sebald K. Stahl, Peoria, Ill., assignor to Caterpillar
Tractor Co., Peoria, Ill., a corporation of California
Filed Nov. 5, 1962, Ser. No. 235,415
4 Claims. (Cl. 74—674)

This invention relates to a wheel drive mechanism and more particularly relates to a motor driven two-speed planetary transmission arranged to selectively drive a vehicle road wheel.

Wheel assemblies of various motor driven vehicles employ drive mechanisms therein to provide at least two speed ranges of vehicle operation. Such mechanisms generally comprise variable speed motors or speed change transmissions mounted inboard of the wheel with the final reduction mechanism being mounted outboard thereof. Variable speed motors require complicated control systems in order to afford a drive mechanism which operates in two or more speed ranges. Conventional speed change transmissions generally necessitate entire removal for servicing thereof. Also, such transmissions require an excessive amount of space when mounted inboard of the wheel assembly and generally require bevel gear drives or the like, due to insufficient room to permit mounting of the motor coaxial with the drive mechanism. Furthermore, such transmissions generally require separate housings and separate lubrication systems.

This invention has overcome many of the above described difficulties by providing a two-speed planetary transmission mounted axially exteriorly or outboard of the support bearing means for the driven wheel. The transmission connects a motor to the wheel in a unique manner to provide two speeds therefor during various phases of vehicle operation.

An object of this invention is to provide an efficient and durable two-speed transmission for drivingly connecting a motor to a wheel to afford a selective drive therefor during various phases of vehicle operation.

A further object of this invention is to provide a compact wheel assembly having a transmission mounted outboard of the bearing supports thereof.

Figure 1:
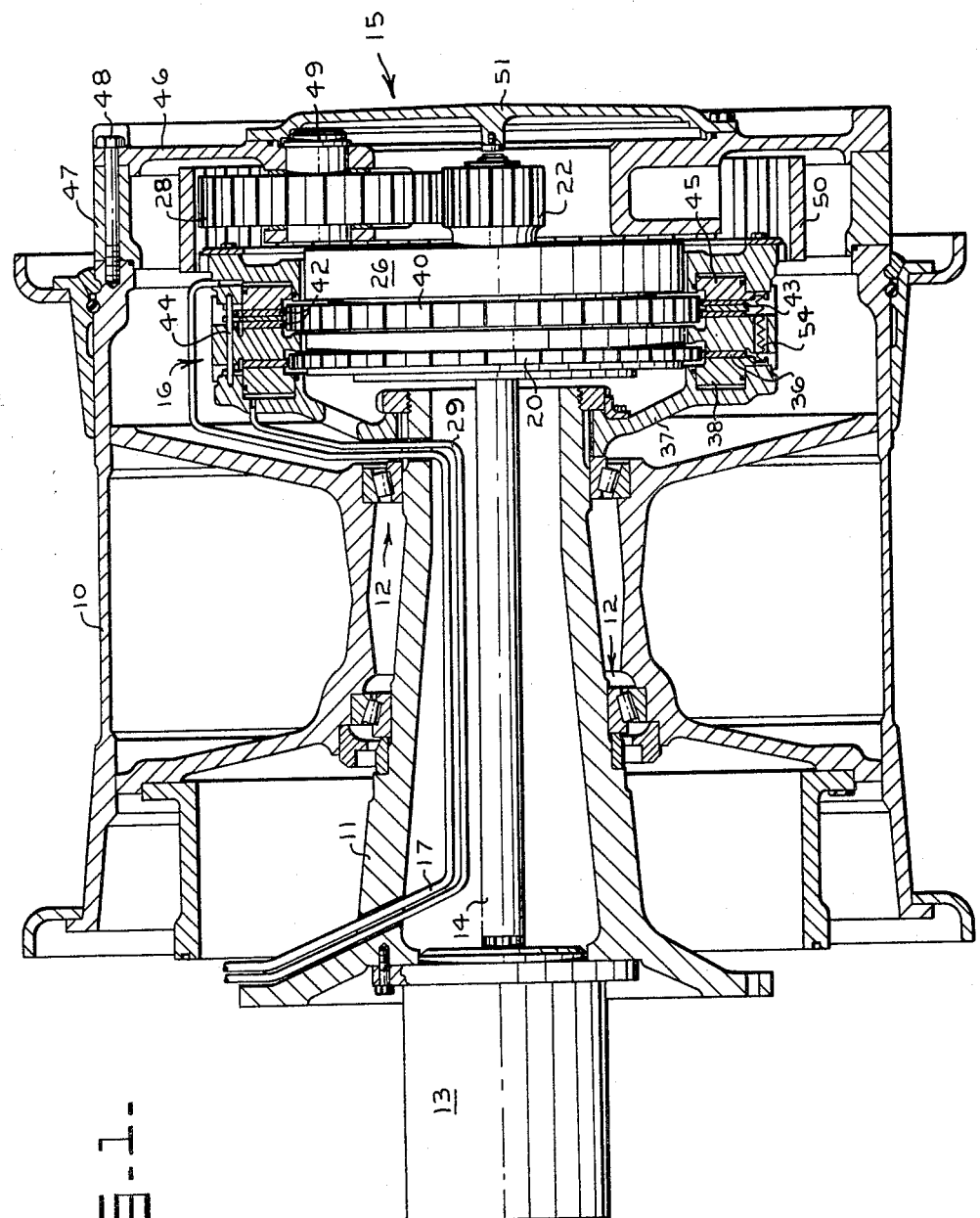
Figure 2:
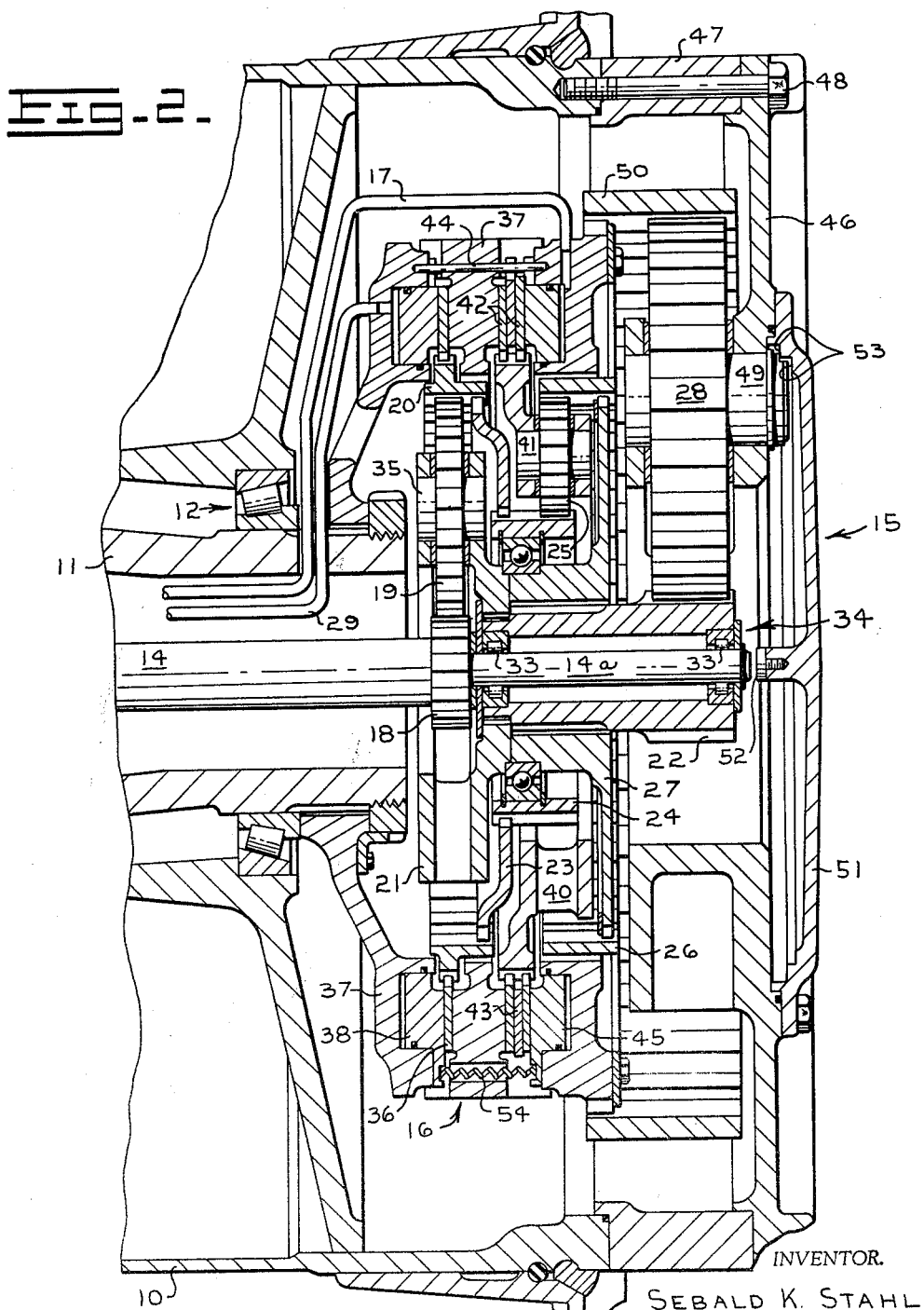

Other and more specific objects of this invention will become apparent from the following description taken in connection with the accompanying drawings wherein:

FIG. 1 is a cross-sectional view of a wheel drive mechanism of this invention comprising a motor arranged to selectively drive a vehicle road wheel through a two-speed transmission; and FIG. 2 is a partial, enlarged view more particularly disclosing novel aspects of the transmission of FIG. 1.

The wheel assembly of FIG. 1 comprises a vehicle road wheel 10 mounted for rotation on a spindle 11 by means of axially aligned roller bearing assemblies 12. The casing of a drive motor 13 is suitably attached to the spindle and is arranged in axial alignment with a shaft 14 for actuation of wheel 10 through a transmission, generally shown at 15. As more clearly shown in FIG. 2, the transmission is mounted axially exteriorly or outboard of bearing assemblies 12 and is further arranged to selectively drive wheel 10 at two different speeds or ratios.

As will be hereinafter more fully understood, selective actuation of a braking means or gear change assembly 16 by means of pressurized fluid contained in conduit 17, functions to transmit wheel driving torque from motor 13 to drive shaft 14, a sun gear 18 (FIG. 2), planet gears 19 (only one is shown) and a ring gear 20. The drive torque is split to direct one-third of such torque, for example, through a first planet gear carrier 21 directly to a second sun gear 22. Two-thirds of such torque is transmitted to sun gear 22 via an annular member 23, a third sun gear 24, second planet gears 25 (only one is shown), a second ring gear 26 and annular member 27. The annular member 27 has splined connections with both the ring gear 26 and the hub of sun gear 22. Torque is thereafter transmitted to the wheel 10 through third planet gears 28 which are drivingly connected thereto. The split torque ratio may be other than that above mentioned and will depend upon the gear arrangements utilized for a particular application.

Pressurizing of the fluid contained in conduit 29 and relief of the fluid pressure in conduit 17 functions to actuate brake assembly 16 to move the wheel at a second and higher speed of operation wherein the torque is not split. Drive is thereafter transmitted to the wheel from the motor 13, drive shaft 14, sun gear 18, planet gears 19, carrier 21, sun gear 22 and planet gears 28. As will be hereinafter more fully understood, the above briefly described constructions and arrangements provide a compact and durable wheel assembly which is highly efficient in operation.

Referring now to the more specific arrangements of FIGS. 1 and 2, motor 13 may be of a conventional type such as hydraulic and operatively connected to a suitable power source for selective actuation thereof. The diameter of the drive shaft is reduced at portion 14a, and rotatably supports sun gear 22 through roller bearings 33. Sun gear 18 is splined or otherwise suitably mounted on the drive shaft and is retained in axially fixed position along with the bearings by means of a conventional washer and snap ring assembly 34.

Planet gears 19 are supported by radially arranged stub shafts 35 (only one is shown) on carrier 21 which is splined to sun gear 22. Planet gears 19 mesh with sun gear 18 and ring gear 20. Brake assembly 16 comprises a suitable annular brake disc 36 arranged for relative axial movement on teeth formed on the periphery of gear 20 and is further arranged to extend radially into a housing 37, fixed to spindle 11. An annular piston 38 is also arranged for relative axial movement in the housing in response to selective pressurization of the fluid contained in conduit 29.

A second planet carrier 40 supports planet gears 25 on a plurality of radially arranged stub shafts 41 (only one is shown). The planet gears mesh with sun gear 24 and ring gear 26. Annular member 27 drivingly connects ring gear 26 to sun gear 22 by suitable spline connections.

Brake assembly 16 further comprises a pair of annular brake discs 42 supported for selective axial movement on the periphery of carrier 40 by suitable spline connections. The brake discs extend radially into the housing and are adapted to be axially moved against a brake disc 43, nonrotatably supported on fixed pins 44, by means of annular piston 45 which operatively associates with conduit 17.

A third planet gear carrier 46 is secured to the outer portions of wheel 10 by means of spacer members 47 and bolts 48. Planet gears 28 are supported thereon by means of radially spaced stub shafts 49. The planet gears are arranged to mesh with sun gear 22 and a ring gear 50, nonrotatably supported on the outer periphery of housing 37 by a suitable spline connection.

A cover 51 is detachably mounted on carrier 46 and is arranged to have inner wall portions 52 and 53 provide means on said wheel for limiting relative axial movement of drive shaft 14 and stub shafts 49, respectively. The above described arrangements function to permit sun gears 18 and 22, planet carriers 21 and 40, planet gears 19 and 25 and ring gears 20 and 26 to be self-centering in nature, relative to planet gears 28 and ring gear 50, primarily since these latter components are rigidly supported on wheel 10 and spindle 11.

In order to effect a first wheel speed, the vehicle operator selectively actuates a suitable control system (not shown) to direct pressurized fluid through conduit 17 to move annular piston 45 in a leftward direction to engage discs 42 with disc 43. The planet carrier 40 is thus non-rotatably secured, relative to housing 37 and spindle 11. Rotation of shaft 14 will thus function to rotate sun gear 18 and planet gears 19 wherefrom the torque is split to drive sun gear 22 in the manner above described.

An efficient split torque arrangement is thus provided wherein a relatively smaller percentage of the torque, for example one-third, is directed through planet carrier 21 directly to sun gear 22 whereas the remaining two-thirds of the torque is indirectly transmitted thereto through ring gear 20 and annular member 27. Such an arrangement is particularly advantageous since it reduces tooth loading on the planet gears 25 during this first transmission speed.

When the operator shifts the controls to effect a second and higher wheel speed, fluid is automatically exhausted from conduit 17, by control means not shown, to permit disengagement of discs 42 from disc 43 due to the action of compression springs 54 (only one is shown) arranged between the annular pistons. Pressurized fluid in conduit 29 simultaneously moves annular piston 38 is a rightward direction to clamp disc 36 against housing 37 to brake ring gear 20. Shaft 14 is thereafter effective to rotate sun gear 18, planet gears 19, carrier 21 and sun gear 22. Sun gear 22 in turn rotates planet gears 28 to drive carrier 46 and thus wheel 10 at the second speed range.

A neutral condition of operation is effected by exhausting pressurized fluid from both conduits 17 and 29. The motor 13 is thus disconnected from wheel 10 to permit a stopping of the vehicle.

I claim:

1. A wheel drive mechanism comprising a wheel arranged on a spindle, axially aligned bearing means rotably mounting said wheel on said spindle, a rotatable drive shaft arranged within, and parallel to, the axis of said spindle and extending the length thereof, a motor fixed to said spindle interiorly thereof and drivingly connected to said drive shaft; a planetary transmission means having a high speed drive ratio and a low speed ratio, said planetary transmission means mounted axially exteriorly of said bearing means and operatively connected to said drive shaft and said wheel for selectively driving said wheel, said transmission means comprises a first sun gear mounted on said drive shaft for rotation therewith, said first sun gear drivingly engaged with first planet gears arranged therearound, a second sun gear rotatably mounted on said drive shaft and operatively connected to said first planet gears to receive a first portion of the driving torque therefrom during said low speed drive and all of the torque therefrom during said high speed drive, second planet gears mounted around and in driving engagement with a third sun gear, said third sun gear mounted for rotation about said second sun gear, said third sun gear and said second planet gears arranged to be operatively connected to said first planet gears and said second sun gear, respectively, for transmitting a second portion of the driving torque to said second sun gear during said low speed drive and third planet gears mounted around and in driving engagement with said second sun gear, said third planet gears drivingly connected to said wheel, a braking means arranged substantially radially outwardly of said transmission gears, for selectively providing a low speed split torque drive or a high speed drive to said wheel.

2. The invention of claim 1 further comprising means on said wheel for limiting axial movement of said drive shaft and said third planet gears.

3. A two-speed planetary transmission comprising a drive shaft, a first sun gear mounted on said drive shaft for rotation therewith, first planet gears mounted around and in driving engagement with said first sun gear, an output gear means, said output gear means operatively connected to said first planet gears to receive driving torque therefrom, second planet gears mounted around and in driving engagement with a second sun gear, said second sun gear mounted for rotation about said drive shaft, said second sun gear and said second planet gears arranged to be operatively connected to said first planet gears and said output gear means, respectively, and means for selectively driving said output gear means from said first planet gears at a first drive speed wherein the torque is split to provide a first torque directly to said output gear means and a second torque through said second sun gear to said output gear means or at a second drive speed directly to said output gear means said selectively driving means comprising plural braking means arranged substantially radially outward of and between said first and second sun gears, said plural braking means including a fixedly mounted annular member concentric with said drive shaft, said member having braking surfaces for the respective braking means.

4. The invention of claim 3 wherein said selectively braking means further comprises a ring gear mounted around and in driving engagement with said first planet gears, a carrier arranged to carry said second planet gears, said braking means arranged for selectively braking either said ring gear or said carrier to prevent rotation thereof.

References Cited by the Examiner

UNITED STATES PATENTS

| | | | |
|---|---|---|---|
| 1,392,157 | 9/21 | Herman et al. | 74—391 |
| 1,783,780 | 12/30 | Evans. | |
| 2,726,726 | 12/55 | Tourneau | 180—10 |
| 2,914,967 | 12/59 | Simpson | 74—759 |
| 3,115,204 | 12/63 | Dence | 180—10 |

DON A. WAITE, *Primary Examiner.*